United States Patent [19]

Hosaka

[11] Patent Number: 4,716,456
[45] Date of Patent: Dec. 29, 1987

[54] CCD COLOR IMAGE SENSOR WITH A LIGHT SOURCE HAVING A SPECTRUM DISTRIBUTION CHARACTERISTIC HAVING PEAKS AT 470 NM AND 590 NM AND HAVING NO WAVELENGTHS ABOVE 700 NM

[75] Inventor: Yasuo Hosaka, Tokyo, Japan
[73] Assignee: Tokya Shibaura Denki Kabushiki Kaisha, Kawasaki, Japan
[21] Appl. No.: 910,303
[22] Filed: Sep. 22, 1986

Related U.S. Application Data

[63] Continuation of Ser. No. 565,158, Oct. 25, 1983, abandoned.

[30] Foreign Application Priority Data

Oct. 28, 1982 [JP] Japan .................. 57-188159

[51] Int. Cl.⁴ .................. G03F 3/08; 404N 1/028; 404N 1/46
[52] U.S. Cl. .................. 358/75; 358/78; 358/294
[58] Field of Search .................. 358/75, 78, 293, 80, 358/294

[56] References Cited

U.S. PATENT DOCUMENTS

| | | | |
|---|---|---|---|
| 3,717,724 | 2/1973 | Montgomery, III | 358/43 |
| 4,271,428 | 6/1981 | Herbst | 358/75 |
| 4,394,675 | 7/1983 | Anagnostopoulos et al. | 357/24 |
| 4,437,111 | 3/1984 | Inai et al. | 358/44 |

FOREIGN PATENT DOCUMENTS

| | | | |
|---|---|---|---|
| 0043721 | 1/1982 | European Pat. Off. | |
| 2504317 | 3/1976 | Fed. Rep. of Germany | |
| 3237977 | 5/1983 | Fed. Rep. of Germany | |
| 7325 | 1/1978 | Japan | 355/69 |
| 64413 | 6/1978 | Japan | 358/293 |
| 154346 | 12/1979 | Japan | 358/75 |
| 31270 | 3/1981 | Japan | 358/294 |
| 56570 | 4/1983 | Japan | 358/75 |
| 168379 | 10/1983 | Japan | 358/293 |
| 912729 | 12/1962 | United Kingdom | |
| 1105192 | 3/1968 | United Kingdom | |
| 1245700 | 9/1971 | United Kingdom | |

OTHER PUBLICATIONS

The Conference of the Institute of Electronics and Communication Engineers of Japan, Komiya et al, p. 1041: 1971.

The Conference of the Institute of Image Electronics Engineers of Japan, Tajiri et al: Jun. 8, 1982.

IEEE IEDM 81 "A 2048-Element Contact Type Linear Image Sensor for Facsimile" K. Komiya et al., 1981, pp. 309-312.

IEEE IEDM 81 "A Contact-Type Linear Sensor with a GD a-Si:H Photodetector Array" Y. Kanoh et al., 1981, pp. 313-316.

IE80-72 "A4 Size Contact Type Image Sensor" K. Komiya et al., 1980, pp. 72-82.

Elenbaas, W., *Fluorescent Lamps and Lighting*, Phillips Technical Library, Cleaver Hume Press, Ltd., London, 1962, pp. 30-35, 52-55.

Charge-Coupled Devices and their Applications, Beynon et al., p. 91, 1980.

*Primary Examiner*—James J. Groody
*Assistant Examiner*—Randall S. Svihla
*Attorney, Agent, or Firm*—Oblon, Fisher, Spivak, McClelland, & Maier

[57] ABSTRACT

In a color image sensor, CCD chips having peculiar spectrum distribution characteristics are arranged in two rows on a base with the CCD chips in one row staggered with respect to those in the other row. A pair of convergent rod lens arrays is located between a color document and the array of CCD chips for projecting an image of the document onto the CCD element array. The CCD elements each having a plurality of photosensitive areas with white, yellow and cyan filters, or yellow, green and cyan filters, or red, green and blue filters, provided thereon. A pair of fluorescent lamps for illuminating the document is each provided in the neighborhood of each of the pair rod lens arrays. They have spectrum distribution characteristics not covering wavelengths above 700 nm. One of them has a spectrum distribution characteristic with a peak substantially at 450 nm, and the other has a spectrum distribution characteristic with a peak substantially at 590 nm. The composite spectrum distribution characteristic of the two lamps has peaks substantially at 480 nm and 590 nm, and has no wavelengths above 700 nm.

23 Claims, 31 Drawing Figures

F I G. 6
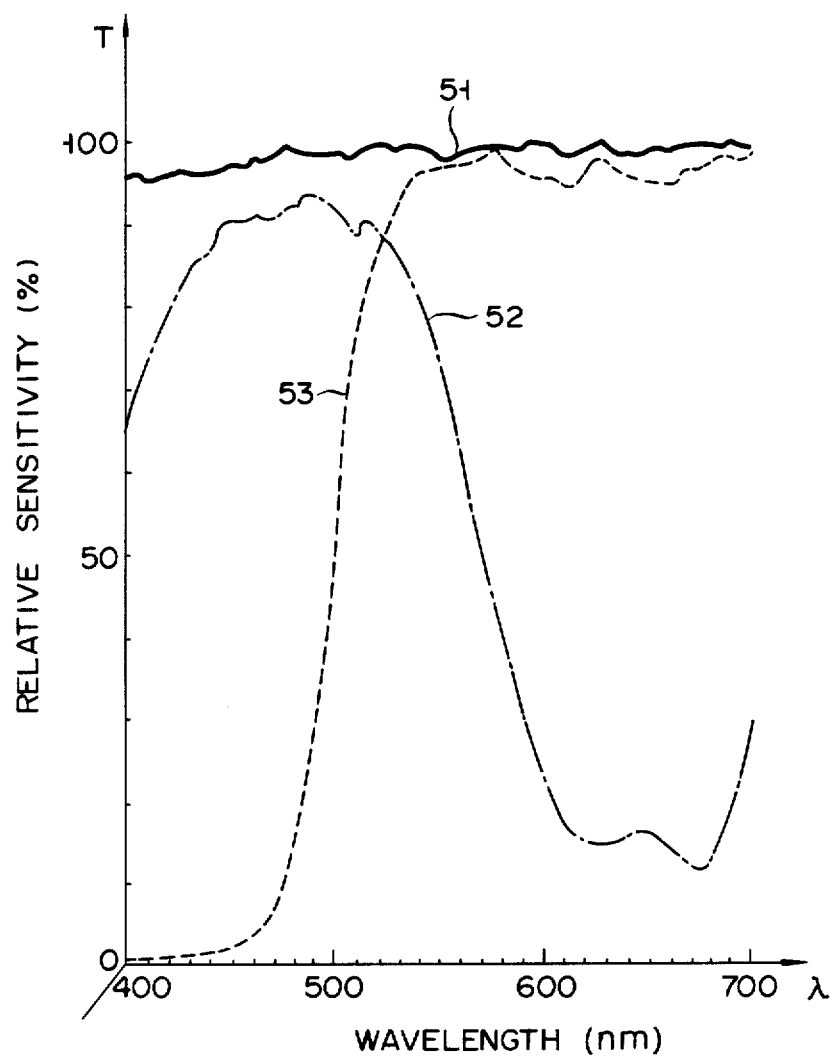

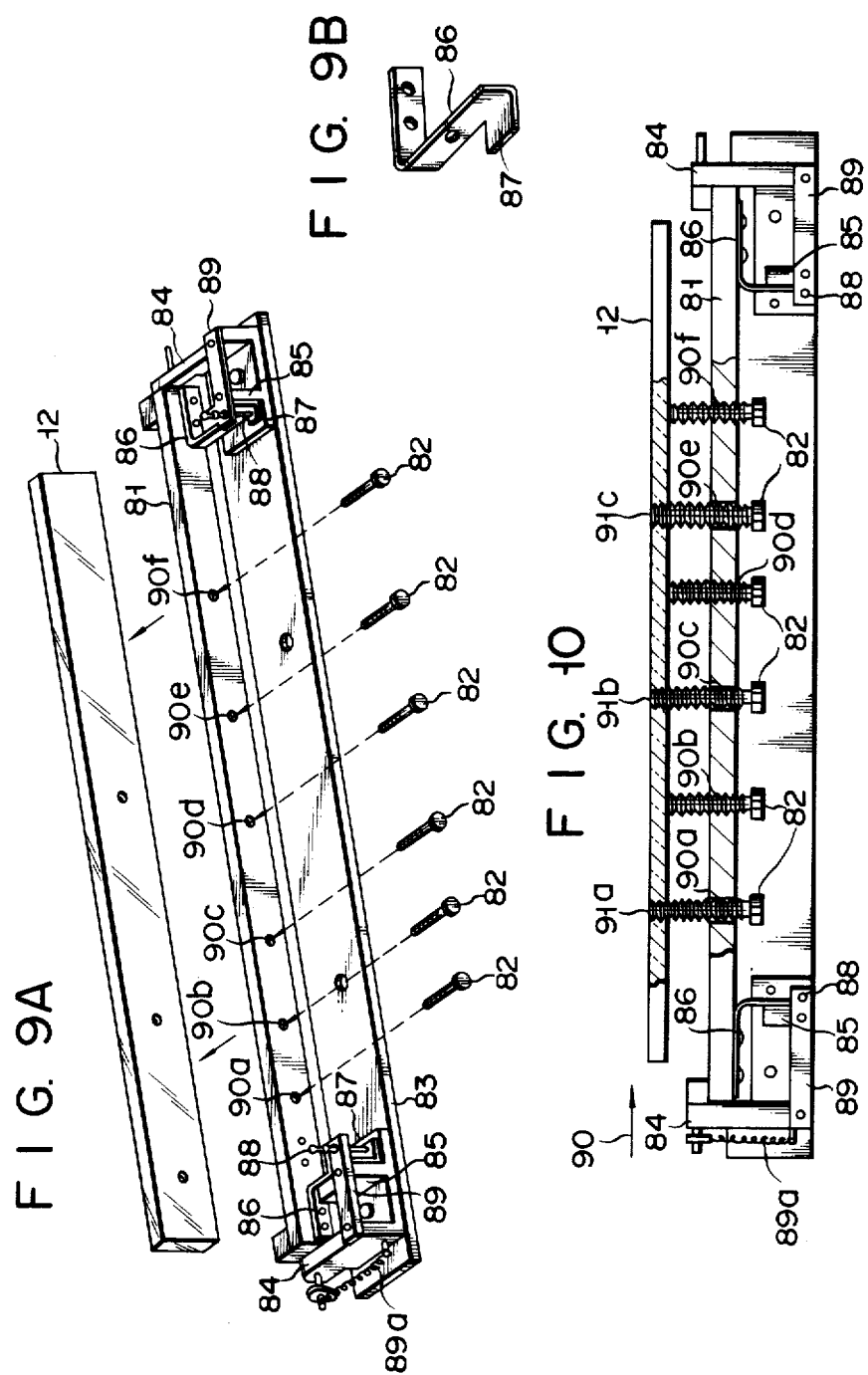

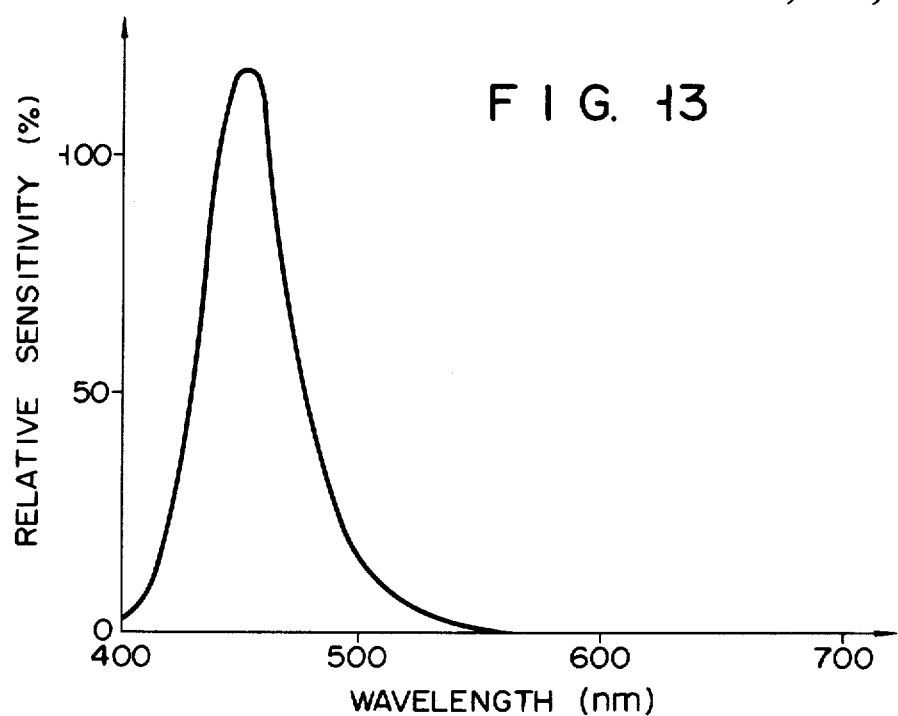
F I G. 13
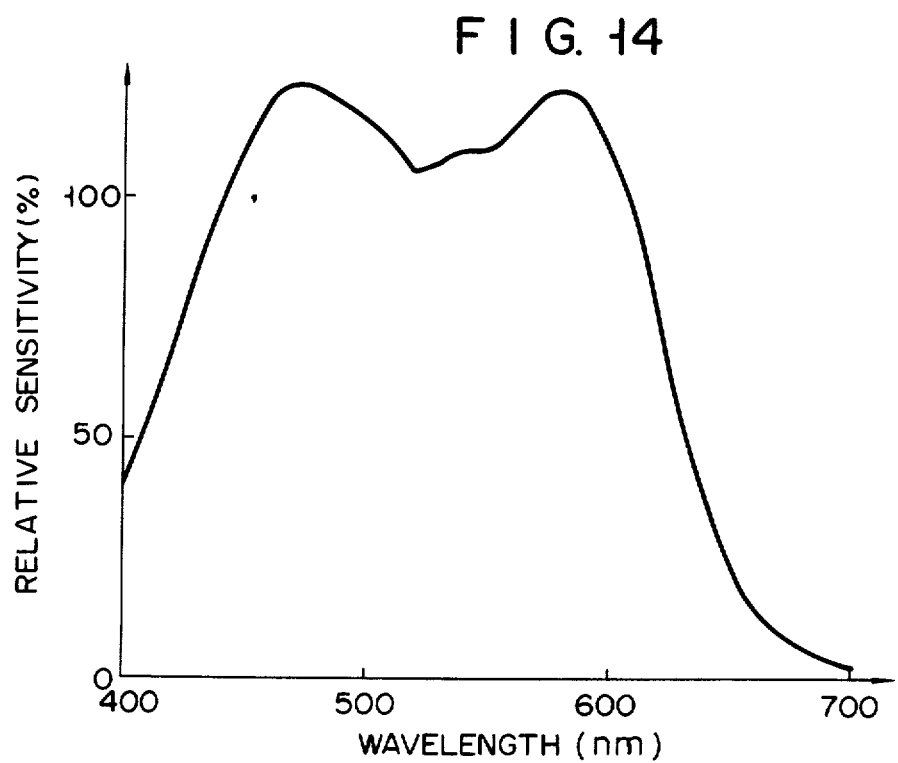
F I G. 14

F I G. 20
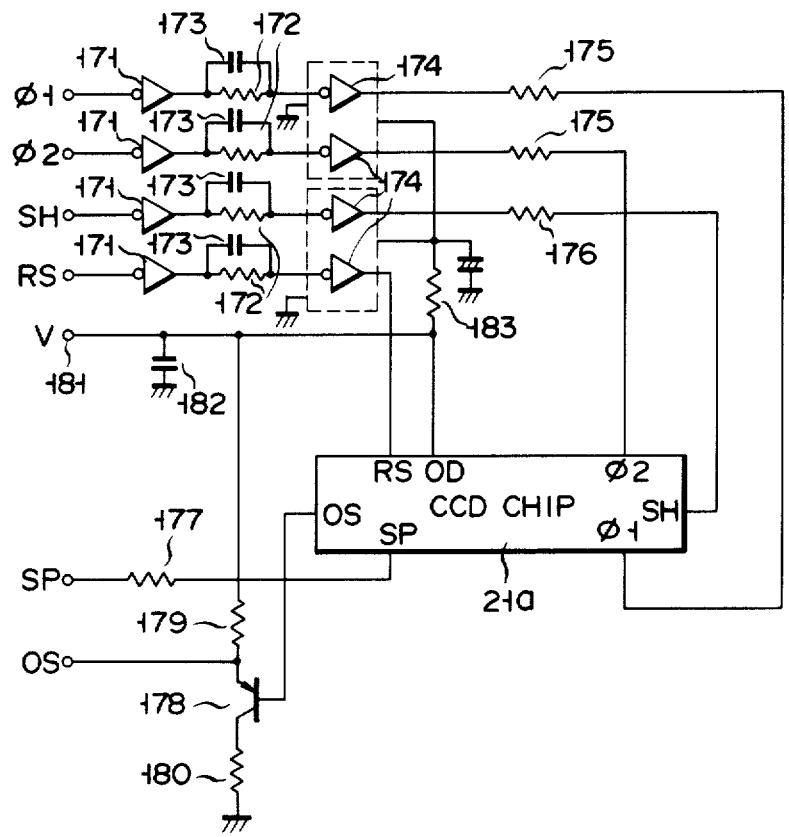

4,716,456

CCD COLOR IMAGE SENSOR WITH A LIGHT SOURCE HAVING A SPECTRUM DISTRIBUTION CHARACTERISTIC HAVING PEAKS AT 470 NM AND 590 NM AND HAVING NO WAVELENGTHS ABOVE 700 NM

This application is a continuation of application Ser. No. 545,158, filed Oct. 25, 1983 now abandoned.

BACKGROUND OF THE INVENTION

This invention relates to a color image sensor and, more particularly, to a color image sensor for reading a color image out of a color document.

Color image sensors for reading color image of a color document adapted for facsimile systems have recently been attracting attention, and efforts have been made for their development. For example, Cd-Se color sensors are disclosed in Tajiri et al, "Study on color photoelectric circuits for proximity sensors" presented in the 1982th Conference of the Institute of Electronic and Communication Engineers of Japan. The sensors based on the Tajiri system are useful as color image sensors. The Cd-Se sensors, however, are limited in their speed of response to light. Also, their image reading rate is 20 msec. per line for monochromatic image at the most.

Further, in this system red, green and blue outputs of color image are obtained without use of any color filter but by switching light sources for the respective colors, i.e., LEDs (light-emitting diode) as red and green light sources and a fluorescent tube as blue light source, for each scanning line. Therefore, to obtain three color images three times the scanning period for monochromatic image is necessary, that is, a reading time of substantially 60 msec. per line is necessary.

Furthermore, photo-sensitive devices used for color sensors including the Cd-Se sensors noted above generally have peculiar spectrum distribution characteristics. Where color image signals from photosensitive elements of such a sensor are processed to re-construct image, therefore, the resultant displayed or printed-out image is liable to differ in color or brightness from the original image due to the peculiar spectrum distribution characteristics of the photosensitive elements. Heretofore, attention has not been paid to the peculiar spectrum distribution characteristics of the photo-sensitive devices and light sources used for color image sensors, nor has sufficient consideration been paid to the color and luminance of the reproduced image.

SUMMARY OF THE INVENTION

An object of the invention is to provide a color image sensor, which can generate signals suited for reproducing an image with satisfactory reproducibility in color and brightness.

According to the invention, there is provided a color image sensor for sensing color of a color document, which comprises a light source having peculiar spectrum distribution characteristics, for emitting light to illuminate the color document, photo-sensitive converting means having two or more photo-sensitive sections having peculiar spectrum distribution characteristics for sensing light from the document to generate electric signals, and two or more different color filters having peculiar spectrum distribution characteristics provided for each of the photo-sensitive sections and on the path of light incident on each photo-sensitive section, the light source, photosensitive converting means and color filters providing composite spectrum distribution characteristics not convering wavelengths above 700 nm.

BRIEF DESCRIPTION OF THE DRAWINGS

FIG. 6 is a graph showing spectrum distribution characteristics of white, yellow and cyan filters provided in a light-receiving section of a CCD chip;

FIGS. 9A and 9B are an exploded perspective view showing a mechanism for adjusting the convergent rod lens arrays shown in FIG. 1;

FIG. 10 is a plan view showing the mechanism of FIGS. 9A and 9B in the assembled state;

FIGS. 12 and 13 are graphs showing the spectrum distribution characteristics of respective fluorescent lamps;

FIG. 14 is a graph showing the composite spectrum distribution characteristics of the fluorescent lamps having the characteristics shown in FIGS. 12 and 13;

FIG. 20 is a circuit diagram showing a driving circuit for the CCD chip shown in FIG. 4;

DETAILED DESCRIPTION OF THE PREFERRED EMBODIMENT

Figure 1:
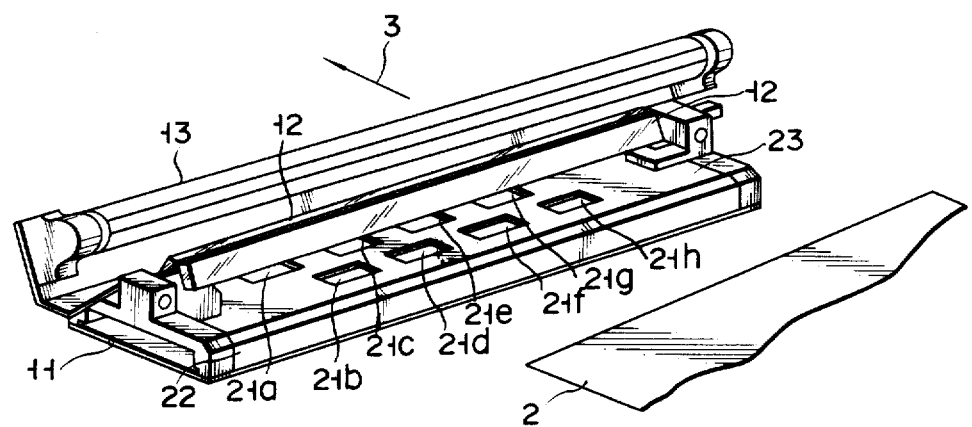
FIG. 1 is a schematic perspective view showing an embodiment of the color image sensor according to the invention.

FIG. 1 shows an embodiment of the color image sensor according to the invention, which can read an image out of a A4 size color document. The color image sensor has a sensor package 11, which has CCD chips as line image sensor elements 21a to 21h provided on its top surface. A pair of convergent rod lens arrays 12 are disposed above the sensor package 11. A pair of linear light sources 13, e.g., fluorescent lamps, are provided in the neighborhood of the rod lens arrays 12. The sensor package, convergent rod lens arrays 12 and linear light sources 13 are assembled together into an integral structure. In FIG. 1, only one of the linear light sources 13 is shown for the sake of simplicity of illustration.

In operation, an image of color document 2 is read out as the color document 2 is fed in the direction of arrow 3. More specifically, as the document 2 is illuminated by the light sources 13, light reflected from it is projected onto the CCD chips 21a to 21h through the convergent rod lens arrays 12. In this operation, the image of characters, patterns, pictures, etc. on the original for one line is formed without any contraction but on equal scale on the array of CCD chips 21a to 21h through the rod lens arrays 12. The image thus formed on the CCD chips 21a to 21h is photoelectrically converted, and charge signals generated in the CCD chips are transferred therethrough to be transmitted as image signals for each line to an external circuit. Successive image signals are produced as the document 2 is fed. In this way, the picture or the like on the original is converted to image signals.

Figure 2:
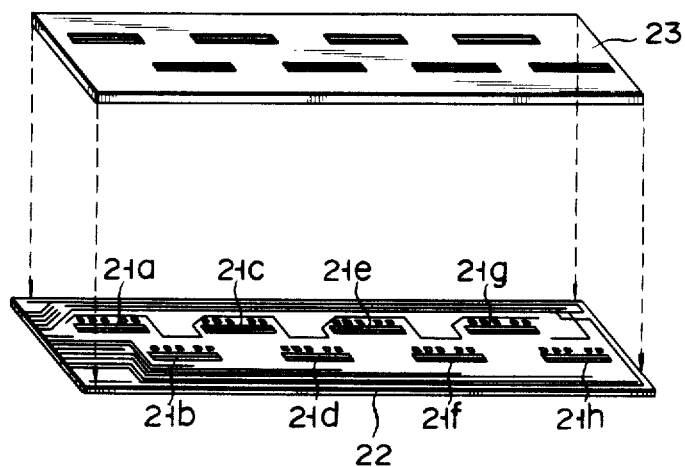
FIG. 2 is an exploded perspective view showing a sensor package shown in FIG. 1.

The components of the color image sensor will now be described. In the example of FIGS. 1 and 2, the sensor package 11 has eight CCD chips 21a to 21h provided in two rows on a ceramic base 22 with the CCD chips in one row staggered with respect to those in the other. The ceramic base 22 is covered by a cover 23.

Figure 3:
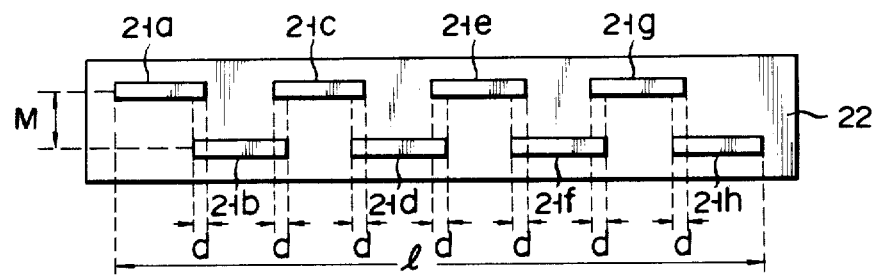
FIGS. 3 and 4 illustrate in plan views the arrangement of CCD chips on a ceramic base.
Figure 4:
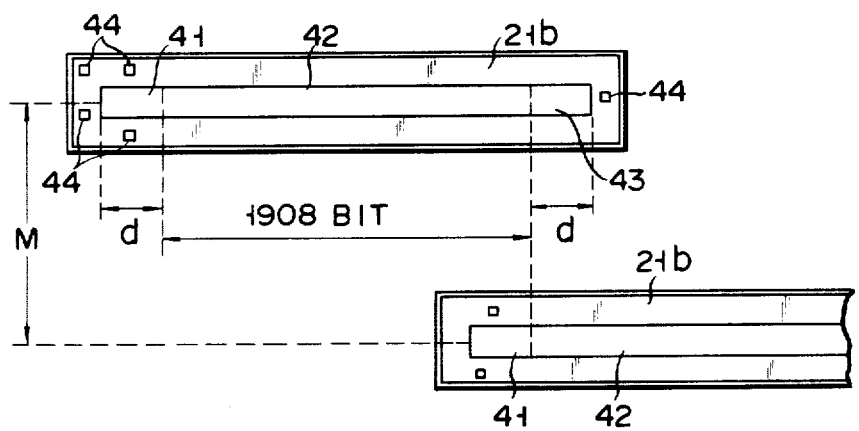
Figure 5:
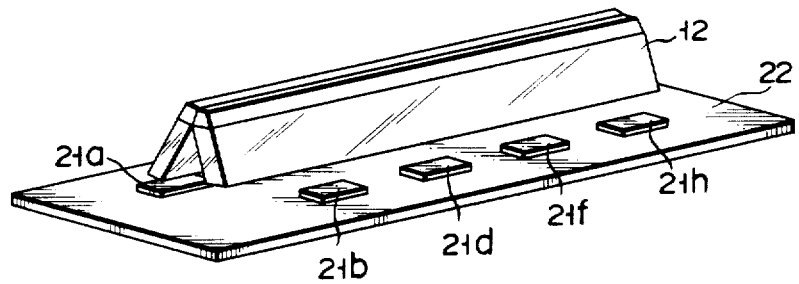
FIG. 5 is a schematic perspective view showing the relation between CCD ships and convergent rod lens arrays.

Commercially available chips such as TCD 102C-1 by Toshiba may be utilized by CCD chips 21a to 21h. As is well known in the art, they each include a p-n photodiode light-receiving section and charger transfer section. The light-receiving section is formed of 2,048 bits (convering approximately 28.7 mm) each having a dimension of 14 $\mu$m by 14 $\mu$m. The two rows of CCD chips 21a to 21h in the staggered arrangement, as shown in FIG. 3, extend parallel with center-to-center distance M. The CCD chips in one row overlap those in the other row by an amount d in the direction of the rows. The amount of lap d is set such that the dimension between the leading end of the CCD chip 21a and the trailing end of the CCD chip 21h corresponds to the width of the original to be read out; in this embodiment the dimension corresponds to the width of A4 size and is 210 mm. The light-receiving section of each of the CCD chips 21a to 21h is not entirely used for the reading. As described above, the light-receiving section of each CCD is formed of 2,048 bits. As shown in FIG. 4, it has a dummy region 41, a 1,908-bit effective reading region 42 and a lap region 43 overlapped by the next CCD chip, these regions being arranged in this order from the left in the FIG. 4. As will be described later in detail, one line portion of the original is focused without contraction but in equal size on the pair of rows of CCD chip 21a to 21h through the respective convergent rod lens arrays 12, each of which has one end facing the corresponding CCD chip row. Image data for one line is thus focused on the two CCD chip arrays. One of the CCD chip arrays corresponds to the line arrangement of the CCD chips 21a, 21c, 21e and 21g and the other of the CCD chip arrays corresponds to the line arrangement of the CCD chips 21b, 21d, 21f and 21h as shown in FIG. 3. To reproduce the same line of image data of the original, all the outputs from all the CCD chips 21a to 21h are necessary. However, since the CCD chips 21a to 21h are arranged in a staggered fashion with a lap as described, data from them includes overlapped portions. The overlapped data is approximately processed by a data processing circuit to be described later in detail.

The light-receiving sections of the CCD chips 21a to 21h are provided with glass filters for obtaining color signals. In installing the glass filters, mechanical precision is important. In this embodiment, the tolerance of the lap region 43 is 1.3 mm from the standpoint of the positional precision of installation of glass filter. Color filter layers or films may be directly formed on the light-receiving sections of CCD chips. This method permits installation of the filters very precisely and only on the light-receiving sections.

Now, a specific array of filters will be described. In this embodiment, white, yellow and cyan filters are provided. One filter covers 2 bits of the light-receiving section, and 6 bits for three colors constitutes one picture element read out.

The spectrum distribution characteristics of the filters will now be described. By the term "spectrum distribution characteristics" in this specification is meant the relation between relative sensitivity and wavelength. The relative sensitivity of the white filter is nearly 100% over the entire wavelength range as shown by curve 51 in FIG. 6. The relative sensitivity of the cyan filter has a peak at the neighborhood of 500 nm and turns to increase again from the neighborhood of 700 nm as shown by curve 52. The relative sensitivity of the yellow filter turns to increase sharply from the neighborhood of 500 nm as shown by curve 53. As is obvious from these curves of the spectrum distribution characteristics of filters, the relative sensitivity of filters is not zero even for wavelengths above 700 nm outside the sensitivity range of man's eyes.

While the filters have the above characteristics, the color image sensor which comprises the filters and CCD chips 21a to 21h as photo-sensitive elements is made similar in function to man's eyes. Aside from the spectrum distribution characteristics of filters, the relative sensitivity of the light-receiving sections of CCD chips 21a to 21h has a peak in the neighborhood of 700 nm and covers effective wavelengths beyond 1,000 nm.

Figure 7:
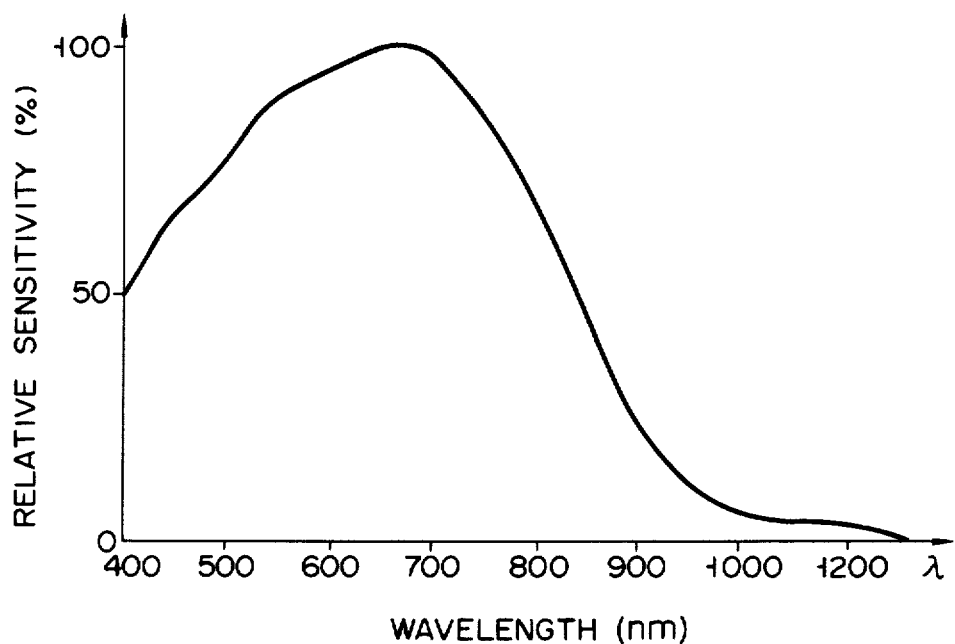
FIG. 7 is a graph showing the spectrum distribution characteristics of the CCD chip.

Obviously from the graphs of FIGS. 6 and 7, the light-receiving section of the CCD chips 21a to 21h with the color filters in this embodiment can respond even to wavelengths above 700 nm. In contrast, the sensitivity of man's eyes is zero for wavelengths above 700 nm as is well known in the art. Therefore, the sole photosensitive elements which are combinations of CCD chips 21a to 21h and white, yellow and cyan filters cannot have the same function as man's eyes. To solve this problem, the invention has resorted to light sources having peculiar spectrum distribution characteristics as will be described hereinafter in detail.

The CCD chips 21a to 21h provided with the color filters are installed on the ceramic base 22 in the arrangement as shown in FIG. 2, and are then covered by the cover 23. The cover 23 has a box-like shape without a bottom and protects the CCD chips 21a to 21h from dust. It has apertures or windows facing the CCD chips 21a to 21h to permit incidence of light thereon, and it is covered by a further glass cover. Light containing image data thus can be led to the CCD chips 21a to 21h while the CCD chips are free from dust attachment.

Figure 8:
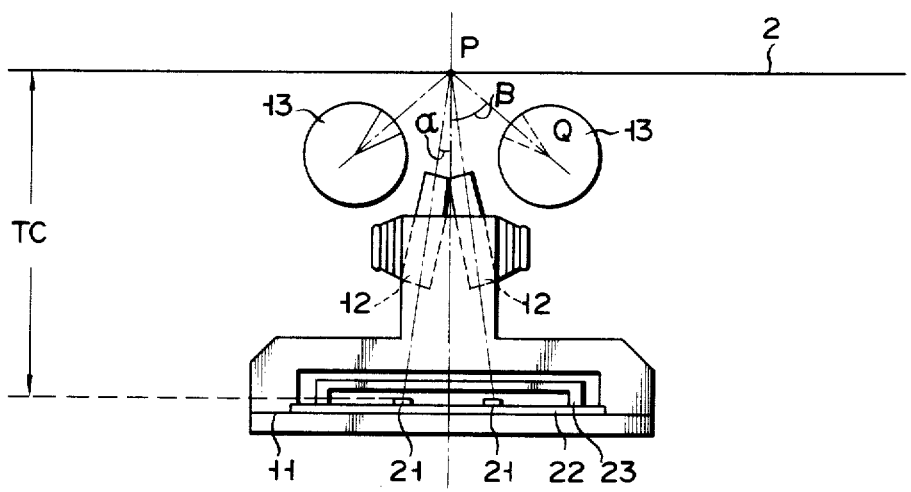
FIG. 8 is a schematic side view, to an enlarged scale, showing the color image sensor shown in FIG. 1.

The convergent rod lens arrays 12 will now be described in detail. Commercially available selfocusing lens arrays may be utilized for the convergent rod lens arrays. In this embodiment, as the convergent rod lens arrays 12 are used those, which are 54 nm in conjugate length, i.e., distance between light incidence and emission side focal points, and 3.15 in equivalent F number. The angle α of their optical axis to the axis of the color image sensor, as shown in FIG. 8, is set substantially to 15°. Point P, at which the axes of the two rod lens arrays 12 intersect, lies in a plane, along which the document 2 proceeds. With the positional relation among the document 2, rod lens arrays 12 and CCD chip arrays 21, the surface of document 2 and CCD chip arrays 21 are in an image-focusing relation to one another so that document image for one line is formed on the CCD chip arrays 21. The rod lens arrays 12 have a large focal depth. Thus, even if the original 2 wavers and departs from the plane of coincidence of the axes of rod lens arrays 12 as it is fed, a clear image can be formed on the CCD chip arrays 12.

Errors of the inclination angle of the convergent rod lens arrays 12 and departures form the parallelness of the arrays 12 in the longitudinal direction thereof will seriously influence the image-focusing relation. That is, accurate positioning of the convergent rod lens arrays 12 is desired from the standpoint of the precise reading. This embodiment includes means for adjusting the position of rod lens arrays 12, as shown in FIGS. 9A, 9B, and 10. As is shown, angle regulator 81 for adjusting the angle of convergent rod lens array 12 extends along the array 21. It has a plurality of adjusting screws 82 for adjusting the distance between angle regulator 81 and rod lens array 12 and securing the rod lens array 12 to the angle regulator 81. In this embodiment, a pair of angle regulators 81 with adjusting screws 82 are provided as adjusting means for the respective convergent rod lens arrays 12, so that the angle thereof can be adjusted independently of each other. The angle regulator 81 is supported over base 83 such that it is slightly tiltable. More specifically, the angle regulator 81 is disposed between a pair of supporting blocks 84 secured to the top of the base 83 such that it is not movable in the longitudinal direction but is rotatable about an axis extending in the longitudinal direction. A pair of substantially L-shaped tilting regulation members 86, the right one of which is shown in FIG. 9B, are symmetrically secured to the opposite ends of the back side of angle regulator 81. A plate portion of each tilting regulation member 86 extending perpendicularly from the angle regulator 81 is in contact with a guide portion 85 of each supporting block 84. As shown in FIG. 9B, each tilting regulation member 86 has a horizontal tongue 87 extending perpendicularly from the angle regulator 81, which is moved substantially in vertical directions with the tiling of the tilting regulation member 86 with the angle regulator 81. An adjusting screw holder 89 is secured to each supporting block 84 or guide portion 85. It has a threaded through hole, in which an adjusting screw 88 is screwed. The tip of adjusting screw 88 is in contact with the top of tongue 87. A shaft of the angle regulator 81 is spring biased by a spring 89a disposed in the neighborhood of the outer side of the supporting block 84 such that it is given a biasing force tending to tilt it toward the front and raise the tongue 87. When the adjusting screw 88 is advanced, the tongue 87 is lowered to cause tilting of the angle regulator 81 toward the back. In this case the angle of angle regulator 81 is increased, and the angle regulator 81 can be brought to a nearly upright position. When the adjusting screw 88 is retreated, the tongue 87 is raised to cause tilting of the angle regulator 81 toward the front, thus increasing the angle thereof.

The angle regulator 81 has holes 90a to 90f formed at a uniform interval in the longitudinal direction. Of these holes 90a to 90f, the holes 90b, 90d and 90f are threaded holes, while the other holes 90a, 90c and 90e are mere through holes without any thread.

The associated convergent rod lens array 12 has holes 91a, 91b and 91c formed at positions corresponding to the holes 90a, 90c and 90e of the angle regulator 81 respectively. The positions of the holes 91a, 91b and 91c are suitably selected such that light transmitted through sections of the lens rod array 12 where the holes 91a, 91b and 91c are provided is not directed to any of the CCD chips 21a to 21h and only light transmitted through the other sections of the array is directed to and projected onto the CCD chips 21a to 21h. The row of CCD chips 21a, 21c, 21e and 21g or row of CCD chips 21b, 21d, 21f and 21h in the CCD chip array 21 have spaced-apart spaces free from the CCD chips, and holes 91a, 91b and 91c are formed in unnecessary sections of the rod lens array 21 corresponding to the spaced-apart spaces.

The holes 90a, 90c and 90e are penetrated by adjusting screws 82, which are screwed in the respective holes 91a, 91b and 91c. The distance between the holes 90a and 91a is adjusted by adjusting the extent, to which the adjusting screw 82 is screwed into the hole 91a. The distance between the holes 90c and 91b and the distance between the holes 90e and 90c are similarly adjusted.

In the holes 90b, 90d and 90f are screwed adjusting screws 82. These adjusting screws 82 are thus secured to the angle regulator 81. Each of these adjusting screws 82 is screwed until its tip reaches the corresponding side of the convergent rod lens array 12, whereby the distance between convergent rod lens array 12 and angle regulator 81 is determined.

The convergent rod lens array 12 is thermally weak and readily warps. The warping can be corrected since the distance between the angle regulator 81 and convergent rod lens array 12 is adjusted at a plurality of points. Further, at the time of adjusting the distance the adjusting screws 81 screwed in the holes 91a, 91b and 91c have an effect of pulling the convergent rod lens array 12 toward the angle regulator 81 while the adjusting screws 82 screwed in the holes 90b, 90d and 90h have an effect of pushing the former out of the latter, the warping of the array 12 can be distributed to make the array 12 flat.

The parallelness between the convergent rod lens array 12 and angle regulator 81 can also be adjusted by the individual adjusting screws 82.

Now, the light source 13 will be described. In this embodiment, a fluorescent lamp having peculiar spectrum distribution characteristics is used as the light source 13. When the color image sensor is used as a reading device for reading an image, it should have the same sensitivity especially in regard to color as a man's eyes. This is so because the image data obtained using the color image sensor is visualized using a display.

It is a general rule that a color image sensor must read what a man sees as black as such and it must be neither superior not inferior to man's eyes so far as the reading of color is concerned.

Figure 11:
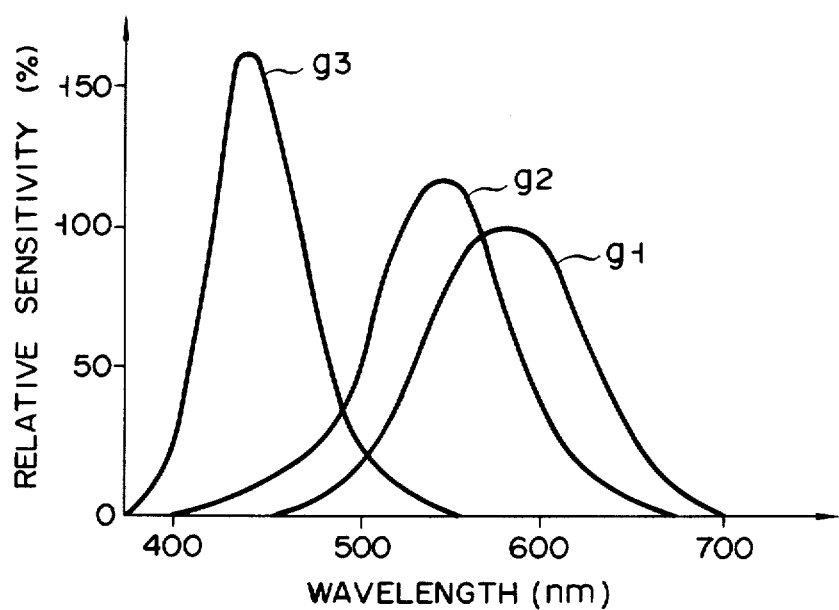
FIG. 11 is a graph showing the spectral sensitivity of man's eyes measured by Thomson and Wright.

FIG. 11 shows relative sensitivity versus wavelength characteristics obtained by Thomson and Wright. The graph represents the sensitivity characteristics of man's eyes to colors, and the sensitivity characteristics means the relation between the luminance sensitivity to colored light and wavelength thereof. Curves $g_1$, $g_2$ and $g_3$ represent sensitivity characteristics to red, green and blue colors respectively. As is obvious from the graph, man's eyes are insensitive to light of wavelengths above 700 nm.

The spectrum distribution characteristics of the photo-sensitive elements which are combinations of the light-receiving sections of CCD chips $21a$ to $21h$ and color filters therefor have certain finite sensitivity levels with respect to light of even wavelengths above 700 nm. Therefore, if white light is incident on such combinations of CCD chips $21a$ to $21h$ and color filters, light of wavelengths above 700 nm are sensed as well. In this embodiment, fluorescent lamps having peculiar fluorescent materials are used to make the total spectrum distribution characteristics of the color image sensor coincide with the sensitivity of man's eyes.

Figure 12:
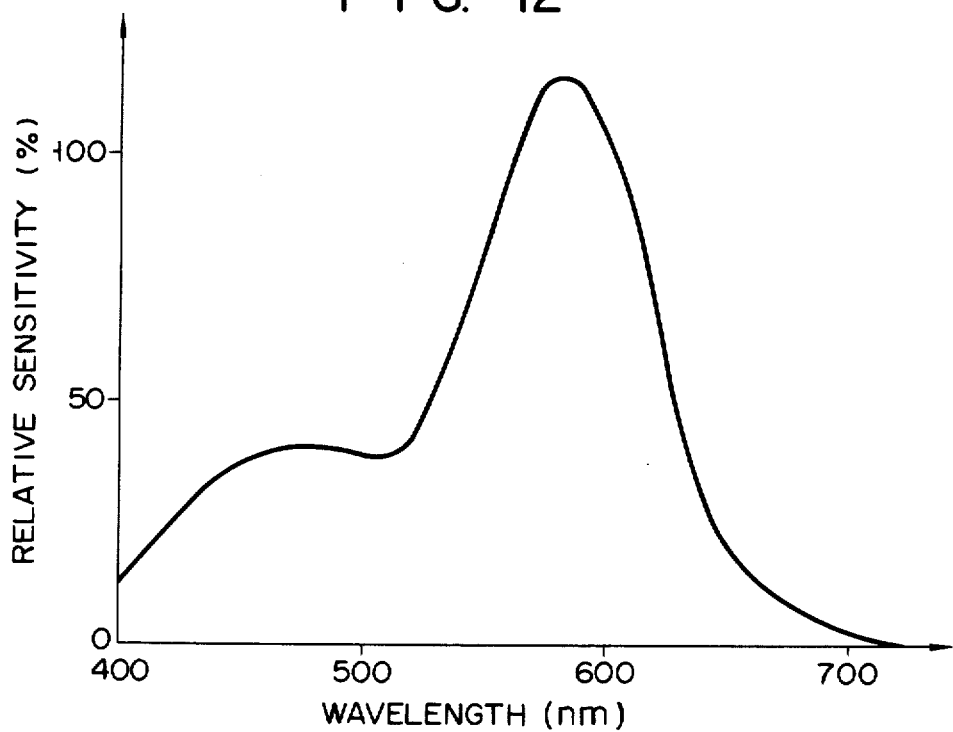

More specifically, the light sensor 13 in this embodiment is provided with a pair of fluorescent lamps having different spectrum distribution characteristics. For example, the fluorescent lamps include inner coatings of white and blue fluorescent materials or phosphors respectively. The white phosphor is made of $3Ca_3(PO_4)_2 \cdot Ca(FCl)_2$:SbMn calcium-halo-phosphate activated by antimony (Sb) and manganese, (Mn), (tradename: Toshiba Phosphors SPD-1457). Its spectrum distribution characteristic has a peak in a wavelength region near 700 nm, i.e., substantially at 590 nm, as shown in FIG. 12. This region is a long wavelength region in the wavelength range below 700 nm required for the light source. The blue phosphor is made of $3Sr(PO_4)_2 CaCl_1$:Eu-strontium-calcium-halo-phosphate activated by europium (Eu), tradename: Toshiba Phosphors (SPD-11J), and its spectrum distribution characteristic has a peak in a wavelength region in the neighborhood of 450 nm. This wavelength region is in the wavelength range below 700 nm necessary for the light source.

Figure 15:
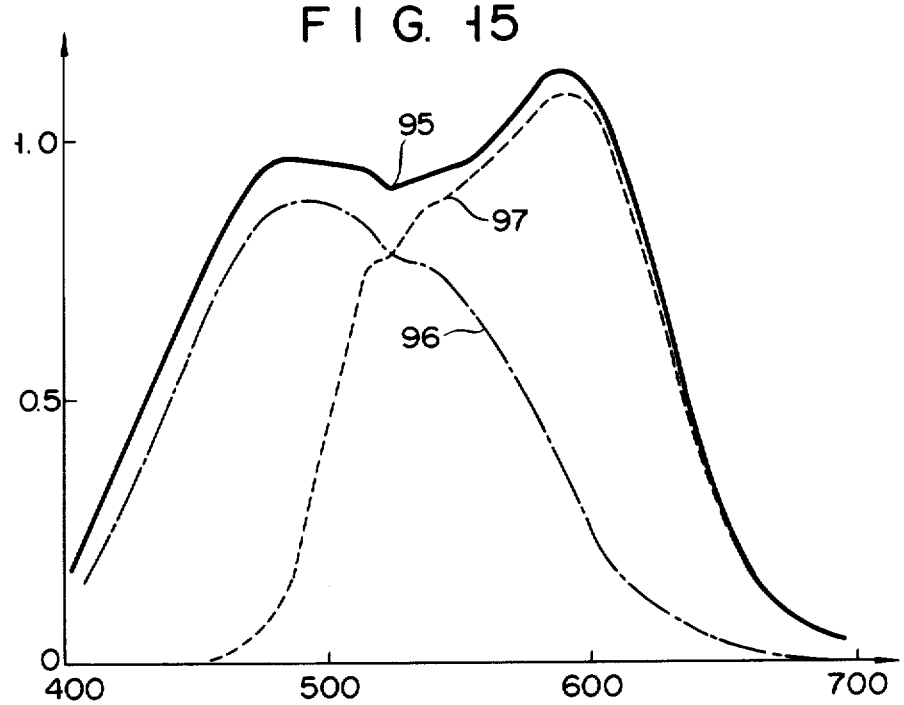
FIG. 15 is a graph showing the spectrum distribution characteristics of cyan, yellow and white light rays obtained with the color image sensor shown in FIG. 1.
Figure 16:
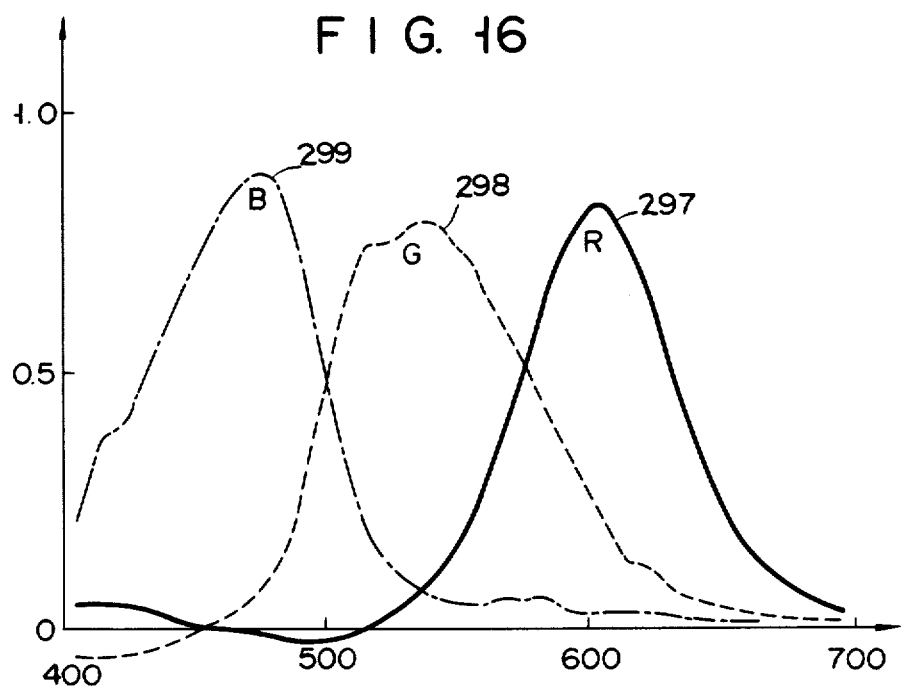
FIG. 16 is a graph showing the spectrum distribution characteristics with blue, green and red light rays corresponding to the characteristics shown in FIG. 15.

The light source 13 thus has the composite spectrum distribution characteristic shown in FIG. 14, which is obtained as the product of the two spectrum distribution characteristics shown in FIGS. 12 and 13. The composite spectrum distribution characteristic has peaks substantially at 470 nm and 590 nm, and has no wavelengths above 700 nm. Light reflected from color document 2 illuminated from this light source 13 is transmitted through the convergent rod lens arrays 12 and filters and is incident on the CCD chip arrays 21. The filters and CCD chips have their peculiar spectrum distribution characteristics as shown in FIGS. 6 and 7. The CCD chips thus sense the incident light with the composite spectrum distribution characteristics representative of the product of the spectrum distribution characteristics of the CCD chips, filter and light source as shown in FIG. 15. The CCD chips sensing white light rays transmitted through the white have a spectrum distribution characteristic as shown by curve 95 in FIG. 15. The CCD chips sensing light transmitted through the cyan filters have the spectral distribution characteristic as shown by curve 96. The CCD sensing light transmitted through the yellow filters have the spectral distribution characteristic as shown by curve 97. Curves 297, 298 and 299 in FIG. 16 represent spectrum distribution characteristics for red, blue and green light corresponding to the respective spectrum distribution characteristics shown in FIG. 15. It will be readily seen that these curves are similar to those of the sensitivity of man's eyes shown in FIG. 11. The signals obtained from the CCD chips thus represent contents which are similar to the red, blue and green colors of the document seen to man's eyes.

Since the CCD chips themselves have peculiar spectrum distribution characteristics as described above, by selecting a light source having peculiar spectrum distribution characteristics having appropriate relation to the spectrum distribution characteristics of the filters it is possible to make the color signal generated from the CCD chip array detecting the colors of the document to correspond in the relative sensitivity to what man's eyes respond to these colors. In other words, the color image sensor of this embodiment substantially has the sensitivity of man's eyes and can sense colors of the original as man's eyes sense them.

The combination of the white, cyan and yellow filters as noted above is by no means limitative, and it is possible to use a combination of yellow, green and cyan filters or a combination of red, green and blue filters as well as shown in FIG. 19b and 19c. Further, the pair of fluorescent lamps having different fluorescent materials as the light source 13 may be replaced with a single fluorescent lamp having two different fluorescent materials, e.g., white and blue phosphors. It is desirable that the fluorescent lamp have the following structure.

Figure 17:
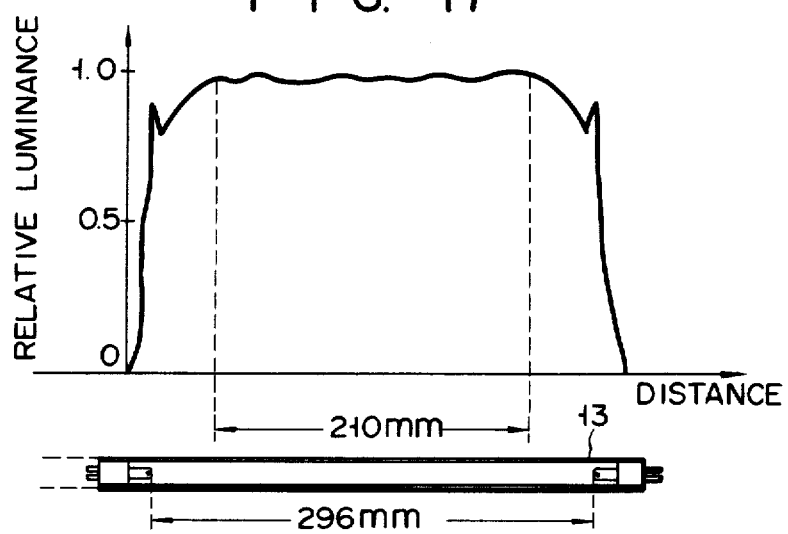
FIG. 17 is a graph showing the relation between the luminance and the fluorescent lamp shown in FIG. 1 and position along the tube axis of the lamp.

While the fluorescent lamp is a linear light source, its brightness is not uniform over the tube length due to influences of its filaments. In this embodiment, the fluorescent lamp has an inter-filament length of 296 mm between the filaments, greater than the A4 size width of 210 mm of document to be illuminated, as shown in FIG. 17, in order to obtain uniform brightness over the entire with of A4 size document. This permits uniform illumination intensity with a tolerance of ±5% to be realized for the A4 size.

Figure 18:
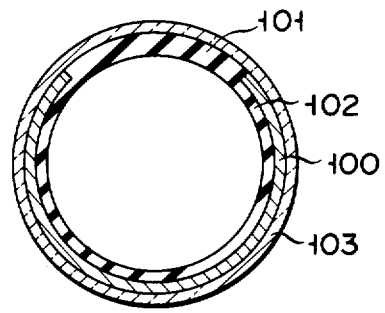
FIG. 18 is a sectional view, to an enlarged scale, showing the detailed structure of the fluorescent lamp shown in FIG. 1.

The fluorescent lamp used in this embodiment has a structure as shown in FIG. 18. It comprises a tube body 103 with a reflecting layer 100 coated on the inner surface such that a slit-like aperture section 101 extending along the tube body axis is defined. A fluorescent material layer 102 is formed to cover the inner surface of the slit-like aperture section 101 and reflecting film 100. If the fluorescent material layer 102 is not coated on the slit-like aperture section 101, the transmittance thereof is higher so that the brightness of light rays therefrom is higher. In this case, however, the tube body 103 will be denatured by ultraviolet rays generated in the tube body 103. With the fluorescent material layer 102 coated on the slit-like aperture section 101 as well as shown in FIG. 18, although the transmittance of the section and hence brightness of light therefrom are sacrificed, the tube body will not be denatured for ultraviolet rays and will not be directly incident on the section, so that the life of the fluorescent lamp can be extended.

The pair of fluorescent lamps 13, as shown in FIG. 8, are desirably disposed such that the optical axes of the convergent rod lens systems extend between them and that the line connecting the point P of intersection of the optical axes of the twp rod lens arrays and the axis Q of each fluorescent lamp 13 has an angle $\beta$ of substantially 45° with respect to the line normal to the plane of the color image sensor passing through the center thereof. As is clearly seen from FIG. 8, the line passing through the points P and Q passes through the center of the slit-like aperture section 101.

In addition to the above structure of color image sensor, the bits in the light-receiving section of the CCD chips $21a$ to $21h$ are arranged at a pitch of appropriately 14 μm, which corresponds to 72 bits per mm. Thus, in case of monochrome the image of document 2 may be read at 72 bits per mm.

Further, as shown in FIG. 19(a), (b) and (c), a color filter, (i.e., either a white, cyan or yellow filter), is provided to cover 2 bits of light-receiving section, and 6 bits constitute one picture element. The resolution is 36 bits per mm in case of monochromic reading and 12 bits per mm in case of color reading. One picture element corresponds to 84 μm.

Now, the electric circuit of the color image sensor will be described. It comprises driving circuits for operating the CCD chips, an analog processing circuit for converting the output signals from the CCD chips into a form suited as video data, and a digital processing circuit for converting the output signal of the analog processing circuit into a digital form suited for storing in a recording apparatus.

The driving circuit will first be described. As shown in FIG. 20, 2-phase clocks $\phi_1$ and $\phi_2$, scanning sync signal SH, reset signal RS, output signal OS and sample/hold circuit SP are supplied from a signal generator (not shown) to the driving circuit. Input terminal, to which the clock signal $\phi_1$ is supplied, is connected to an inverter 171. The output terminal of inverter 171 is connected to a parallel arrangement of resistor 172 and speed-up capacitor 173. The output terminal of the parallel arrangement is connected to an input terminal of inverter 174. The output terminal of inverter 174 is connected to a resistor 175 which is connected to input terminal of CCD chip, to which the clock $\phi_1$ is fed.

A similar circuit is connected between the input terminal, to which the clock signal $\phi_2$ is supplied, and the input terminal of CCD chip, to which the clock signal $\phi_2$ is fed.

Input terminal, to which the scanning sync signal SH is supplied is similarly connected through inverter 171, a parallel arrangement of resistor 172 and capacitor 173 and inverter 174. The output terminal of inverter 174 is connected to a resistor 176. The resistor 176 is connected to a terminal of CCD chip, to which the scanning sync signal SH is fed. Output terminal, from which the output signal OH is supplied, is connected through a resistor 179 to the emitter of a pnp transistor 178. The collector of pnp transistor 178 is connected to a resistor 180 which is grounded at the other terminal. The base of pnp transistor 178 is connected to a terminal of CCD chip, to which the output signal OS is fed. Voltage V for operating the CCD chip is supplied from a voltage source (not shown) to terminal 181. A grounded capacitor 182 is connected to the terminal 181. The terminal 181 is connected through resistor 179 to the emitter of transistor 178 and also to terminal OD of CCD chip, to which voltage is supplied. For each of the inverters 171 in the above construction, SNL04 may be used, and for a pair of inverters 174, DS0026 may be used. Voltage for operating each pair of inverters 174 constituted by DS0026 is supplied from the terminal 181 through a resistor 183. The two-phase clocks $\phi_1$ and $\phi_2$ are necessary for the transfer of charge generated in each bit of each of the CCD chips 21a to 21h. Since the charge transfer is effected at high speed, waveform distortion is liable to result. To solve this problem, the resistance of resistors 175 and 176 are set to optimum values. The scanning sync signal SH serves to define one scanning period in the transfer of charge from the CCD chip. The reset signal RS is a signal for erasing bits after the completion of charge transfer. The output signal OS is supplied from the CCD chip 21a. The CCD chip 21a has 2,048 bits and generates dummy signal and reference black level signal as well as effective image signal. The reference black level signal is a dark level current signal of the light-receiving section and used for obtaining a true output representing a corresponding color as will be described hereinafter in detail.

The analog processing circuit will now be described with reference to FIG. 21. It is provided for each of the CCD chips 21a to 21h. Here, one for the CCD chip 21a will be described.

Figure 21:
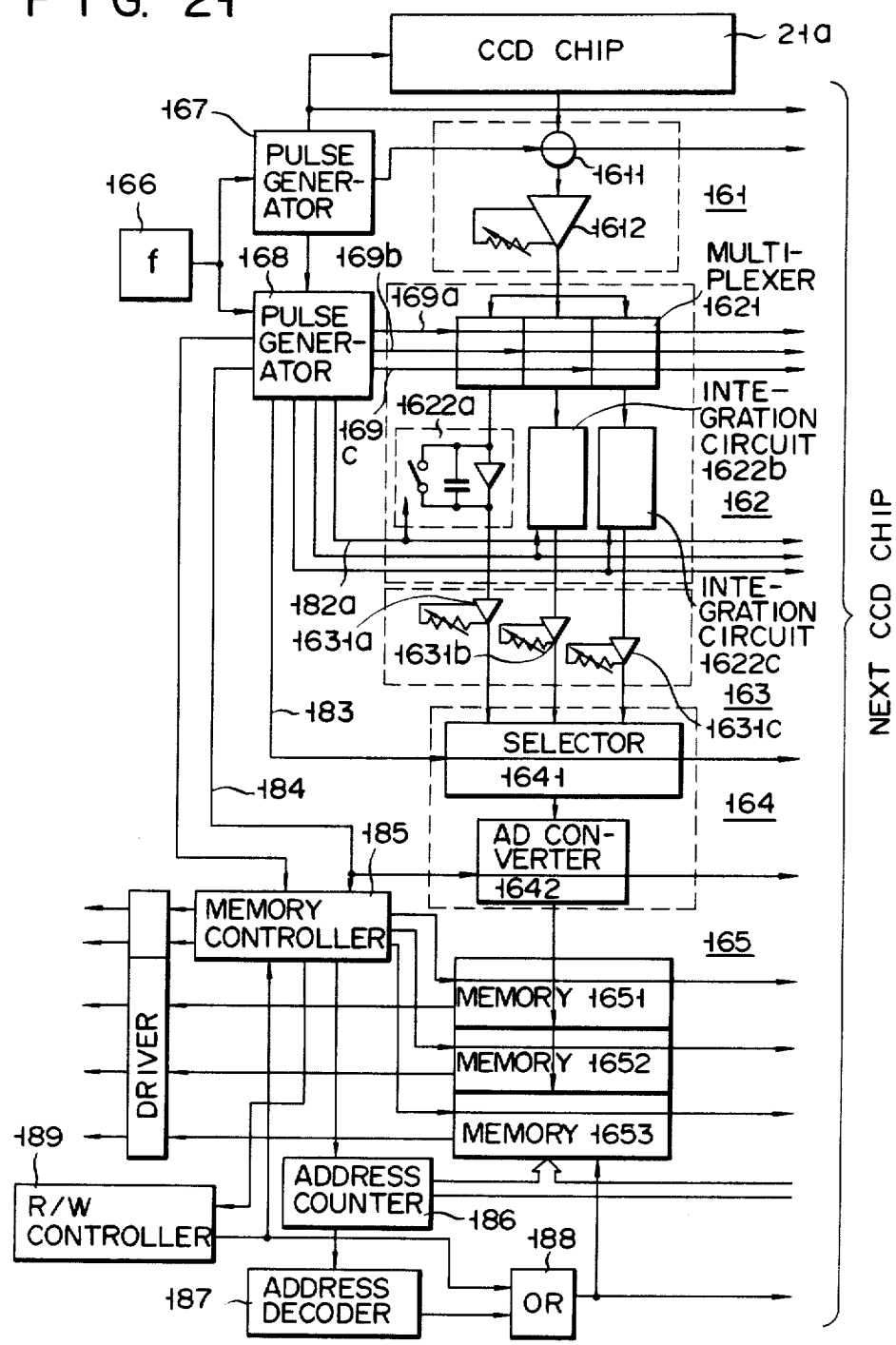
FIG. 21 is a schematic representation of an analog processing circuit for processing signal from CCD chip.

As shown in FIG. 21, the circuit includes a correcting section 161 for correcting the output signal from the CCD chip 21a, an integrating section 162 for dividing the output signal from the correcting section 161 into color signals for the elementary colors and integrating the each color signal, an amplifying section 163 for amplifying the outputs from the integrating section 162, an A/D converting section 164 for converting the amplified output analog signals to digital signals, and a memory section 165 for storing the digital signals. The correcting section 161 has a zero clamping circuit 1611 and an amplifier 1612. The integrating section 162 has a multiplexer 1621 and integrators 1622a to 1622c for integrating the divided color signals from multiplexer 1621. The amplifying section 163 has amplifiers 1631a to 1631c corresponding to the respective integrators 1632a to 1632c. The A/D converting section 164 has a selector 1641 for selectively passing the amplified color signals and an A/D converter 1642 for converting the output of selector 1641 into digital signal. The memory section 165 has memories 1651 to 1653 for the respective colors.

Figure 19:
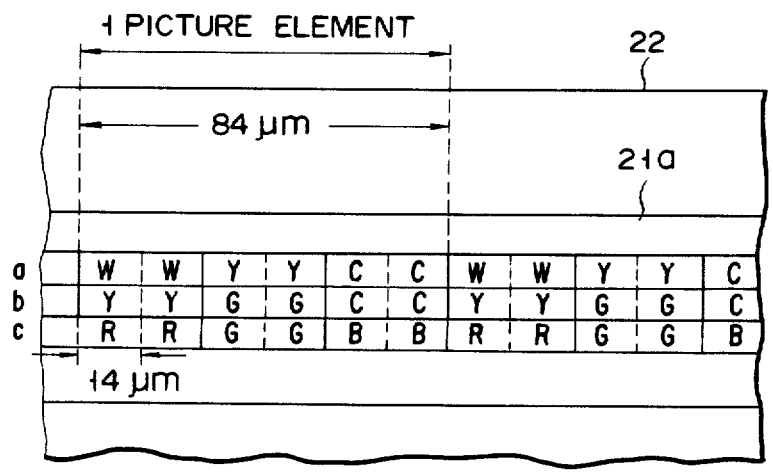
FIG. 19 is a view showing the arrangement of the filters provided in the light-receiving section of the CCD chip shown in FIg. 4.
Figure 22:
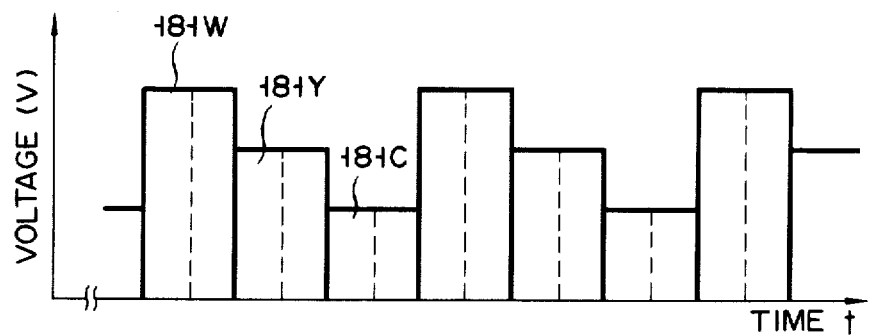
FIGS. 22, 23A to 23C, 24, 25 and 26A to 26C are waveform diagrams showing voltage waveforms in various parts of the circuit shown in FIG. 21.
Figure 23A:
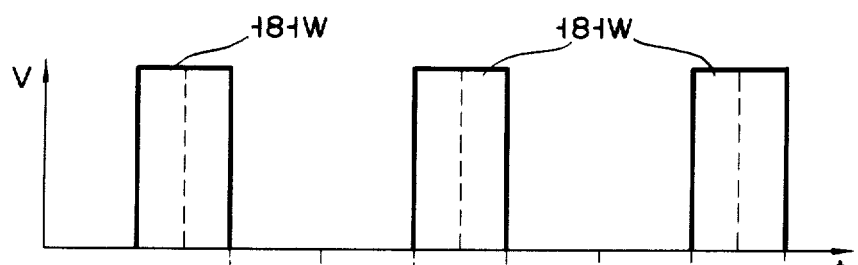
Figure 23B:
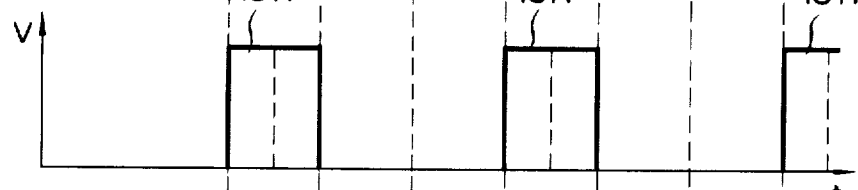
Figure 23C:
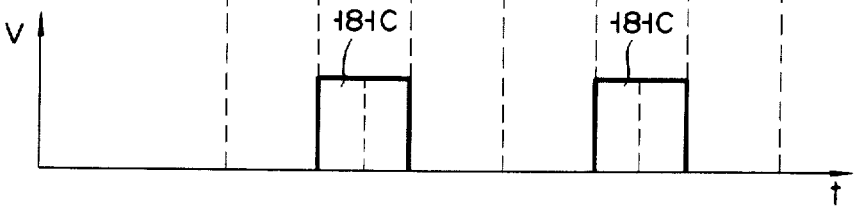
Figure 24:
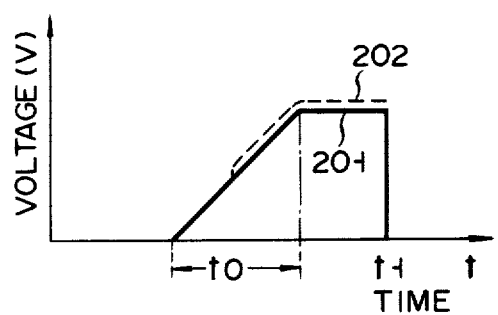
Figure 25:
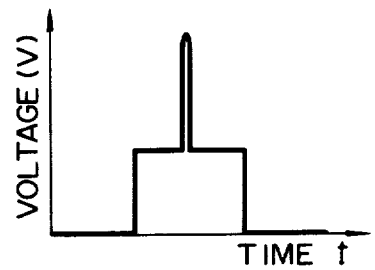

The CCD chip 21a receives signals from a pulse generator 167 which suitably adjusts a pulse signal from an oscillator 166. These signals are the scanning sync signal SH, reset signal RS and two-phase clocks $\phi_1$ and $\phi_2$ for operating the driving circuit for driving the CCD as noted before. The output signal from the CCD chip 21a which receives the various signals is produced in the individual bit regions of the light-receiving section. The CCD chip used in this embodiment is TCD102C-1, and its receiving section has a dummy region, a 6-bit black reference level region, a 1,908-bit effective reading region and dummy region, these regions being arranged successively in the mentioned order. The black reference level region on which no light rays are incident produces a voltage which corresponds to dark current and is referred to as a reference voltage. An image signal from the effective reading region is superimposed on the reference voltage and has a voltage level which is small compared to the reference voltage; in a typical example, the reference voltage is 6 to 8 V while the voltage of the image signal from the effective reading region is of the order of 100 mV. Therefore, it is undesirable from the standpoint of signal processing to handle the output signal from the effective reading region directly. More specifically, it is desired to remove the reference voltage from the output signal for obtaining image signals corresponding to the individual white, cyan and yellow filters. In this embodiment, the zero clamping circuit 1611 produces a difference of the output signal of the effective region from the reference voltage level. The output signal, that is, the image signal of the zero clamping circuit 1611, which is a low level signal, is amplified by the amplifier 1612. The output signal from the amplifier 1612 includes components corresponding to the output signals from the effective reading region and following dummy region. In the effective reading region, each of the white, yellow and cyan filters is provided to cover two consecutive bits, as shown in FIG. 19. When the document is a white paper sheet so that reflected light is white light, 2-bit white signal 181W, 2-bit yellow signal 181Y and 2-bit cyan signal 181C, as shown in FIG. 22, are produced successively from the zero clamping circuit 1611. Actually, the individual color signals are transferred in a spaced-apart relation to one another, but the space between consecutive signals is ignored in FIG. 22. The output signal of the amplifier 1612 is fed to the multiplexer 1621. The output of the multiplexer 1621 is switched by the control signal supplied from a pulse generator 168. The control signal is related to the two-phase clocks $\phi_1$ and $\phi_2$ from the pulse generator 167, and it is synchronized to the signal transferred from the CCD chip 21a. The first 2-bit signal is provided from the multiplexer 1621 when a "1" output appears on signal line 169a. The second and third two-bit signals are provided when a "1" output appears on respective signal lines 169b and 169c. More specifically, when "1" output appears on signal line 169a, the output signal of multiplier 1612 is fed to the integrator 1622a (which corresponds to white filter). When "1" output appears on signal line 169b, the output signal is fed to the integrator 1622b (which corresponds to yellow filter). When "1" output appears on signal line 169c, the output signal is fed to the integrator 1622c (which corresponds to cyan filter). In the above way, the signals for the colors of the respective color filters, as shown in FIGS. 23A to 23C, are provided from corresponding three output terminals of the multiplexer 1621. Each of the integrators 1622a to 1622c integrates the input signal for a period $t_0$. As a result, its capacitor is charged to build up a constant voltage V as shown by solid line 201 in FIG. 24.

The pulse generator 168 supplies a control signal to discharge the capacitors of the integrators 1622a to 1622c during the period from the generation of each 2-bit signal till the generation of the next 2-bit signal. More specifically, at an instant $t_1$ after the lapse of a predetermined period from the reaching of the constant voltage V by the capacitor of, for instance, the integrator 1622a corresponding to the white filter, a signal "1" is supplied from the pulse generator 168 to signal line 182a. As a result, a switch in the integrator 1622a is closed to cause a discharge of the capacitor, thus initializing the integrator 1622a. With the construction of the integrators 1622a to 1622c as described, it is possible to minimize the effects of noise that might be superimposed on the signal transferred from the CCD chip. The noise may include those due to introduction of charge into the CCD, due to wavering of charge during transfer, at the time of detection of charge, etc. The correcting section 161 of the analog processing circuit is provided on the ceramic base 22 together with the CCD chip 21a, but the other components of the circuit are provided separately and connected to the CCD chip 21a through signal lines. These signal lines are liable to pick up noises. These noises have serious effects on image data. However, the process of integration is not an instantaneous process but is effected for a certain period of time. Thus, noise contained in the signal is averaged as shown by dashed line 202 in FIG. 4, so that its adverse effects can be substantially eliminated.

Figure 26A:
Figure 26B:
Figure 26C:

The amplification factors of the amplifiers 1631a to 1631c are set such that the outputs thereof have an equal level $V_2$, as shown in FIGS. 26A to 26C.

It is to be noted that the signals from the individual amplifiers 1631a to 1631c, as shown in FIGS. 26A to 26C, are respectively outputted during different periods of time.

These signals are fed to the selector 1641. To the selector 1641 is supplied a control signal from the pulse generator 168 through a signal line 183. It is synchronized to the generation of 2-bit signals from the CCD chip 21a. The selector 1641 controls the output timing of the amplifiers 1631a to 1631c with the control signal. More specifically, when control signal is supplied to the selector 1641 in a state with the output of the amplifier 1631a, for instance, being related to the output of the selector 1641, the output from the amplifier 1631b is supplied as the output of the selector 1641. When the next control signal is supplied to the selector 1641, the output from the amplifier 1631c is supplied as the output of the selector 1641.

In the above way, output signals from the selector, which correspond to the white, yellow and cyan filters are sequentially supplied to the A/D converter 1642. The output signals are converted into digital signals by the A/D converter 1642 to which a start signal is supplied from the pulse generator 168 through signal line 184. The operation of the A/D converter 1642 is controlled by the start signal. The A/D converter 1642 thus provides 6-bit digital signal representing the white, yellow and cyan outputs as its output signal.

In this embodiment, a continuous signal from the CCD chip 21a is separated by the multiplexer 1621 into three 2-bit color signals for the respective colors. The individual color signals are integrated for two bits by the respective integrators 1622a to 1622c. This means that the number of signals for each color is one-sixth the number of signals from the CCD chip 21a. The effective reading region of the CCD chip 21a having 1,908 bits are mentioned earlier, and one-sixth of this bit number, i.e., 318 bits, is covered by the output signal of one filter.

The digital signals are stored in the memory section 165. The memory section 165 is provided for each of the CCD chips 21a to 21h, and its memories 1651 to 1653 are provided for the respective white, yellow and cyan signals. The memories 1651 to 1653 are each a static RAM (random access memory) with a capacity of 324×6 bits. Since the output signal of the A/D converter 1642 is a 6-bit signal, they each can store 324 color digital signals. Thus, each memory has addresses from "0" to "323". The color digital signal corresponds to signals generated by the sections of the light-receiving section where the white, yellow and cyan filters are provided.

Now, writing of data in the memories 1651 to 1653 and reading of data therefrom will be described. In this connection, the arrangement of the CCD chips 21a to 21h and removal of the lap portion of signal due to the convergent rod lens arrays 12 are important.

The A/D converter 1642 always supplies digital signal to the memories 1651 to 1653 at all time. Memory address control for writing data is thus necessary. In this embodiment, memory controller 185, address counter 186, address decoder 187, OR gate 188 and read/write controller 189 are provided for the reading control. The memory controller 185 supplies write pulse synchronized to the start signal transferred from the line 184 to each of the memories 1651 to 1653 for the white, yellow and cyan signals in response to a write command of "1" from the read/write controller 189. The static RAM having the memories 1651 to 1653 is released from a write inhibit state in response to the write pulse. In other words, while the memories 1651 to 1653 are continuously supplied with digital signal, a memory capable of writing output data of the A/D converter 1642 is selected according to the write pulse. The pulse generator 168 further supplies clock pulse signal to the memory controller 185. The memory controller 185 supplies this clock pulse signal to the address counter 186. The output of the address counter 186 is simultaneously supplied to the memory sections 165 of all the CCD chips 21a to 21h. Meanwhile, the write command of "1" from the read/write controller 189 is fed to the OR gate 188, and the output thereof is used as a chip select signal. More specifically, in the presence of signal "1" supplied from the OR gate 188 to the memory section 165, writing is caused in response to a write signal, and reading in response to a read signal, according to the address designation. In this embodiment, the signal "1" from the OR gate 188 is simultaneously supplied to all the memories 1651 to 1653 in the memory section 165. Thus, the output of the analog-to-digital converter 1642 is simultaneously supplied to the memories in the memory section and stored therein as parallel data. At this time, data can be stored in addresses from "0" to "323" of each of the memories 1651 to 1653.

The digital data transferred to the memories 1651 to 1653 consists of not only signals transferred from the effective reading region of the CCD chip 21a but also signals transferred from the subsequent dummy region. The signals transferred from the effective reading region, include 318 signals for each color, which signals are 6-bit digital signals. Data is thus written in all the effective addresses "0" to "323" of the memories 1651 to 1653. The data written in the memories 1651 to 1653 include color signal from the effective reading region and dummy signal from dummy region.

When the writing of data in the memory section 165 is completed, this is informed from the memory controller 185 to the read/write controller 189. As a result, the read/write controller 189 ceases to provide the write command. Meanwhile, the memory controller 185 commences to supply a read pulse to the memories 1651 to 1653. The static RAMs constituting the memories 1651 to 1653 are thus released from a read inhibit state. Further, clock pulse is supplied from the memory controller 185 to the address counter 186. The output count of address counter 186 is incremented by "1" every time a clock pulse is supplied. When the count reaches a preset number A ($318 \leq A \leq 323$), it is cleared, and this is informed to the address decoder 187. While the preset number A is not reached by the count of the address counter 186, the address decoder 187 is selecting the memory section 165 for the CCD chip 21a. When the preset number A is reached, it turns to select the memory section for the CCD chip 21b. When the preset number A is reached again, it turns to select the memory section for the CCD chip 21c. In this way, the memory sections for the other CCD chips 21d to 21h are successively selected. For the reading of data from the memory section 165, chip select signal, address data and read pulse are supplied from the address decoder 187. More specifically, data is read out successively from the memory sections for the respective CCD chips 21a to 21h. Data about the white, yellow and cyan filters are concurrently read out. In the reading operation, the preset number A noted above is important. It determines the range of addresses of the memories 1651 to 1653, from which data is to be read out. The CCD chips 21a to 21h are arranged with a lap provided between adjacent ones as noted before, and this lap has to be removed. In this embodiment data read out from the leading end of the effective reading region of the CCD chip is stored in the memories 1651 to 1653, and the data from the dummy region other than the effective reading region is the region of the lap and has to be removed. Errors are introduced when bonding the filters to the CCD chips 21a to 21h and also when installing these CCd chips on the base. When data stored in the memory sections 165 for all the CCD chips are read out, the effective reading region and lap region can be readily distinguished from one another. The preset number A is determined according to the results of reading. It may vary with the individual memory sections 165. Image data that is read out in the above way will faithfully represent the image of document for the same scanning line.

The above embodiment has been given for the purpose of illustration only and by no means limitative of the scope of the invention as claimed in the claims. For example, the sequence distribution characteristics of the light source may be suitably selected according to the color filters and photosensitive elements. For instance, the spectral sensitivity may be suitably selected by usng other fluorescent materials e.g., $AgWO_4$, for the fluorescent lamp.

As has been described in the foregoing, according to the invention it is possible to provide a color image sensor, which permits reproduction of image in satisfactory color and brightness.

What is claimed is:

1. A color image sensor in combination with a light source for sensing the color image of a color document, comprising:
   a light source having a spectrum distribution characteristic with a peak substantially at a wavelength of 470 nm for emitting light rays to illuminate the color document;
   charge-coupled photosensitive converting means having a plurality of picture elements, each of the picture elements being constituted by three photosensitive sections having substantially the same specific spectrum distribution characteristic, for sensing light rays from the document to generate electric signals; and
   a plurality of sets of three different color filters, said three different color filters having different specific spectrum distribution characteristics, one set of color filters being provided for each of said plurality of picture elements, the color filters of each set being positioned in the path of light rays directed to corresponding photosensitive sections of a corresponding picture element, said light source and one of said three different color filters providing a composite spectrum distribution characteristic not covering wavelengths above 700 nm.

2. The color image sensor in combination with a light source according to claim 1, wherein said light source has a spectrum distribution characteristic not covering wavelengths above 700 nm.

3. The color image sensor in combination with a light source according to claim 1 wherein said light source has a spectrum distribution characteristic having a peak substantially at a wavelength of 590 nm.

4. The color image sensor in combination with a light source according to claim 1, wherein said light source comprises a fluorescent lamp.

5. The color image sensor in combination with a light source according to claim 4, wherein said fluorescent lamp has a white fluorescent material layer.

6. The color image sensor in combination with a light source according to claim 4, wherein said fluorescent lamp has a blue fluorescent material layer.

7. The color image sensor in combination with a light source according to claim 4, wherein said fluorescent lamp includes a tube body, a reflecting film coated on the inner surface of said tube body and defining a slit-like aperture section extending along the axis of said tube body and a fluorescent material layer formed on said reflecting film and slit-like aperture section.

8. The color image sensor in combination with a light source according to claim 1, wherein said three different color filters are white, yellow and cyan filters.

9. The color image sensor in combination with a light source according to claim 1, wherein said three different color filters are yellow, green and cyan filters.

10. The color image sensor in combination with a light source according to claim 1, wherein said three different color filters are red, green and blue filters.

11. The color image sensor in combination with a light source according to claim 1, further comprising a lens system for transmitting light from the document to said photosensitive sections of said photo-sensitive converting means.

12. A color image sensor in combination with a light source for sensing the image of a color document comprising:
   a plate-like base;
   photosensitive converting elements comprising charge-coupled devices arranged in two rows on said base with the photosensitive elements in one of said rows staggered with respect to the photosensitive elements in the other row, each of said photosensitive elements having a plurality of photosensitive areas;
   a light source having a spectrum distribution characteristic having a peak substantially at 470 nm for emitting light to illuminate the color document;
   a lens system for transmitting light from the document to said two rows of photosensitive elements; and
   color filters each having a different spectrum distribution characteristic provided for the photosensitive areas of the photosensitive elements, with one filter positioned in the path of light directed to each of the photosensitive areas, said light source, said photosensitive converting elements and said color filters providing a composite spectrum distribution characteristic not covering wavelengths above 700 nm.

13. The color image sensor in combination with a light source according to claim 12, wherein said lens system is a pair of rod lens arrays, each of said pair of rod lens arrays being provided for a respective one of said two rows of photosensitive elements.

14. The color image sensor in combination with a light source according to claim 12, further comprising means for adjusting the position of said lens system.

15. The color image sensor in combination with a light source according to claim 12, wherein said light source has a spectrum distribution characteristic not covering wavelengths above 700 nm.

16. The color image sensor in combination with a light source according to claim 12, wherein said light source has a spectrum distribution characteristic having a peak substantially at a wavelength of 590 nm.

17. The color image sensor in combination with a light source according to claim 12, wherein said light source comprises a fluorescent lamp.

18. The color image sensor in combination with a light source according to claim 17, wherein said fluorescent lamp has a white fluorescent material layer.

19. The color image sensor in combination with a light source according to claim 17, wherein said fluorescent lamp has a blue fluorescent material layer.

20. The color image sensor in combination with a light source according to claim 17, wherein said fluorescent lamp includes a tube body, a reflecting film coated on the inner surface of said tube body and defining a slit-like aperture section extending along the axis of said tube body and a fluorescent material layer formed on said reflecting film and slit-like aperture section.

21. The color image sensor in combination with a light source according to claim 12, wherein said color filters are white, yellow and cyan filters.

22. The color image sensor in combination with a light source according to claim 12, wherein said color filters are yellow, green and cyan filters.

23. The color image sensor in combination with a light source according to claim 12, wherein said color filters are red, green and blue filters.

* * * * *

UNITED STATES PATENT AND TRADEMARK OFFICE
CERTIFICATE OF CORRECTION

PATENT NO. : 4,716,456

DATED : 12/29/87

INVENTOR(S) : Yasuo Hosaka

It is certified that error appears in the above-identified patent and that said Letters Patent is hereby corrected as shown below:

Title page:

--Related U.S. Application Data is incorrectly recorded. It should read:

Continuation of Ser. No. 545,158, Oct. 25, 1983, abandoned.--

Signed and Sealed this

Fourteenth Day of June, 1988

Attest:

DONALD J. QUIGG

*Attesting Officer*

*Commissioner of Patents and Trademarks*